United States Patent [19]

Hosono

[11] 4,332,445
[45] Jun. 1, 1982

[54] FLASH LIGHT DISCHARGE TUBE CONTROL DEVICE

[75] Inventor: Tsutomu Hosono, Tokyo, Japan

[73] Assignee: Fuji Photo Optical Co., Ltd., Omiya, Japan

[21] Appl. No.: 940,615

[22] Filed: Sep. 8, 1978

Related U.S. Application Data

[63] Continuation of Ser. No. 788,465, Apr. 18, 1977, abandoned.

[30] Foreign Application Priority Data

Apr. 16, 1976 [JP] Japan .................................. 51-43317

[51] Int. Cl.³ ........................ G03B 17/24; G03B 15/05
[52] U.S. Cl. ..................................... 354/106; 354/145
[58] Field of Search ............................... 354/32-34, 354/60 F, 105-109, 129, 139, 145, 149, 22, 59, 250; 346/107 UP; 352/208, 214; 362/4, 5

[56] References Cited

U.S. PATENT DOCUMENTS

| | | | |
|---|---|---|---|
| 3,525,332 | 8/1970 | Kosaka | 352/214 X |
| 3,538,825 | 11/1970 | Taylor | 362/4 |
| 3,764,849 | 10/1973 | Ohta | 315/241 P |
| 3,849,784 | 11/1974 | Holzapfel | 354/109 X |
| 3,889,281 | 6/1975 | Taguchi et al. | 354/109 |
| 3,917,395 | 11/1975 | Ogawa | 354/149 X |
| 4,112,444 | 9/1978 | Yonemoto et al. | 354/106 |

FOREIGN PATENT DOCUMENTS

| | | |
|---|---|---|
| 47-23928 | 7/1972 | Japan . |
| 47-34334 | 8/1972 | Japan . |
| 48-17083 | 5/1973 | Japan . |

Primary Examiner—L. T. Hix
Assistant Examiner—William B. Perkey

[57] ABSTRACT

In a camera provided with a data printing device in addition to a strobo flash light device, a charging stop switch is provided to stop the supply of power to the strobo flash light device while the data printing device is operated. A single power source is commonly used for energizing the strobo flash light device and the data printing device. The data printing device or a shutter release mechanism is connected with the charging stop switch so that the power source may be connected only with the data printing device while the data printing device is electrically operated to print data on a film in the camera. Upon completion of the operation of the data printing device, the power source is connected to the strobo flash light device to charge a main capacitor in the strobo flash light device.

5 Claims, 4 Drawing Figures

FLASH LIGHT DISCHARGE TUBE CONTROL DEVICE

This is a continuation, of application Ser. No. 788,465, filed Apr. 18, 1977, now abandoned.

BACKGROUND OF THE INVENTION

1. Field of the Invention

This invention relates to a flash light discharge tube control device, and more particularly to a device for controlling the supply of power to a flash light discharge tube attached to a camera body which includes an electrically operated device in addition to the flash light discharge tube.

2. Description of the Prior Art

A flash light discharge tube which is called "strobo" flash light tube is energized by a capacitor. The capacitor is charged before the light is emitted by the discharge of the strobo. In order to charge the capacitor in a short time, a blocking oscillator is used for instance. The circuit including the blocking oscillator, the capacitor for energizing the strobo tube and a power source for supplying power to the blocking oscillator is further provided with a power switch which is closed to supply power to the blocking oscillator before the strobo is energized and a synchronizing trigger switch which is connected with a shutter release mechanism in the camera and is closed to discharge the capacitor and make the strobo tube emit flash light. While the power switch is closed, the charging of the capacitor is started immediately upon discharge thereof.

On the other hand, it has recently been popularized to provide a data printing device in the camera. The data printing device is operated in response to release of the shutter and prints data such as the date of photographing on the film loaded in the camera. The data printing device is also operated by an electric power. Further, it is sometimes desired that a motor drive device for automatically winding up the film in the camera be attached to or incorporated in the camera body. In this case also, the motor drive device is electrically operated. In these cases wherein the camera is provided with an electrically operated device in addition to a strobo device, it is desired that a single power source be commonly used for energizing both the strobo and the additional electrically operated device from the viewpoint of manufacturing cost and size of the camera. Further, if more than one battery is loaded in the camera body, the photographer would have to keep watch on all of the batteries. Therefore, it is desirable that only one power source be provided in a camera body.

The camera provided with only one power source and more than one electrically operated device including a strobo device, however, suffers from a defect in that the additional electrically operated device such as a data printing device is not supplied with a sufficiently high level of power when the charging of the capacitor for discharging the strobo is started. The data printing operation is conducted normally immediately after the release of shutter. After the release of shutter, the charging of the capacitor for discharging the strobo is started. Therefore, in case that the data printing device is operated while the capacitor is charged, there is a possibility of malfunction of the data printing device since the level of the power source is greatly lowered when the capacitor starts to be charged.

SUMMARY OF THE INVENTION

The primary object of the present invention is to provide a device for controlling the supply of power to a flash light discharge tube attached to a camera body in which the malfunction of an additional electrically operated device in the camera body is prevented.

A more specific object of the present invention is to provide a flash light discharge tube control device which stops supplying electric power to he capacitor for discharging the tube while an additional electrically operated device such as a data printing device is supplied with power immediately after the release of shutter.

The above objects are accomplished by providing a charging stop switch in the camera in addition to a power switch so that the charging of the capacitor for the flash light tube may be stopped while the additional electrically operated device such as a data printing device is electrically operated.

DESCRIPTION OF THE PREFERRED EMBODIMENTS

Figure 1:
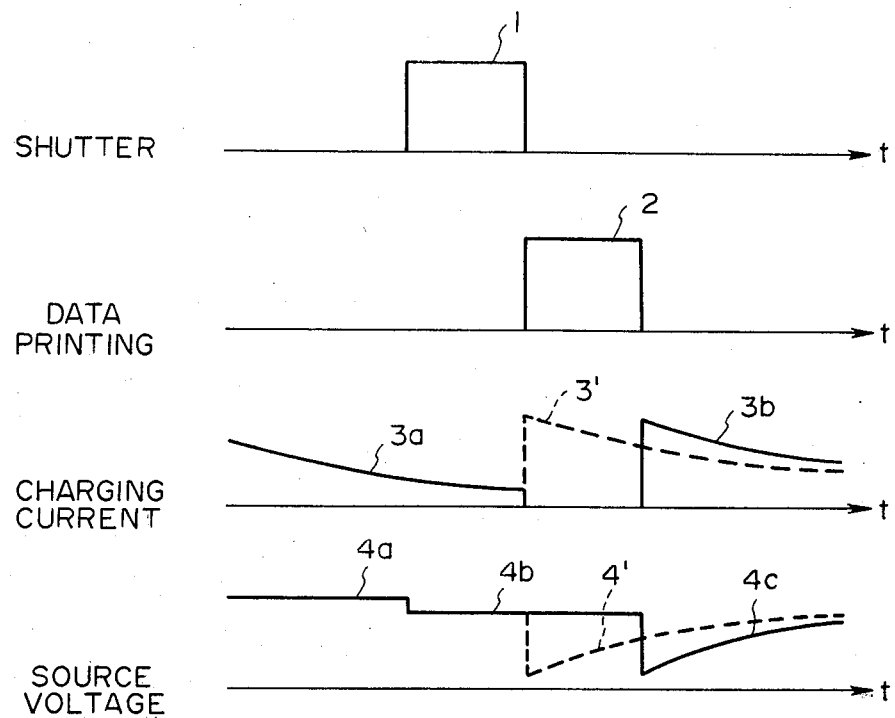
FIG. 1 is a time chart which shows the sequential operation of a shutter and a data printing device and the change in the capacitor charging current and in the power source level.

The control device in accordance with the present invention stops the supply of power to the capacitor for discharging the strobo tube while the additional electrically operated device such as a data printing device is supplied with power. The operations of the shutter and the data printing device and the change in charging current and the source voltage are shown in FIG. 1. Immediately after the shutter operation 1, the data printing device is operated as shown at 2. The current used for charging the capacitor for the strobo falls until the shutter is released as shown at 3a. In the conventional camera, the capacitor for strobo starts to be charged immediately after the release of shutter and accordingly the charging current is abruptly raised upon completion of the shutter release as shown by a broken line 3'. In such a case, the voltage of the power source is markedly lowered when the charging is started as shown by a broken line 4'. In the present invention, the supply of power to the capacitor is stopped while the data printing device is operated as shown by a solid line 3b. Therefore, the level of the power source is not lowered until the operation of the data printing device is completed as shown by a solid line 4b. After the data printing operation is finished, the level is lowered as shown at 4c. The level 4b is a little lowered from the initial level 4a when the shutter operation starts.

Now a preferred embodiment of the present invention will be described in detail with reference to FIG. 2. A power source E is connected commonly with an electric shutter means including a data printing device 11 and a strobo flash light device including a capacitor 12. A conventionally well known oscillator circuit 13 is connected between the power source E and the strobo device 12. A power switch Sa is connected between the power source E and the oscillator circuit 13 and is closed when the strobo is to be operated. A normally open switch Sb is connected between the base and the emitter of an oscillating transistor 14. The normally open switch Sb is closed while the data printing device is supplied with power. For instance, the normally open switch Sb is mechanically connected with a shutter release mechanism or a data printing device so that the switch Sb is closed when the shutter release is completed or the data printing operation is started. The normally open switch Sb works as a charging stop switch when closed. Namely, when the switch Sb is closed, the base and the emitter of the transistor 14 for oscillation are short-circuited and the oscillating circuit is not operated and the capacitor in the strobo device 12 is not charged.

Figure 2:
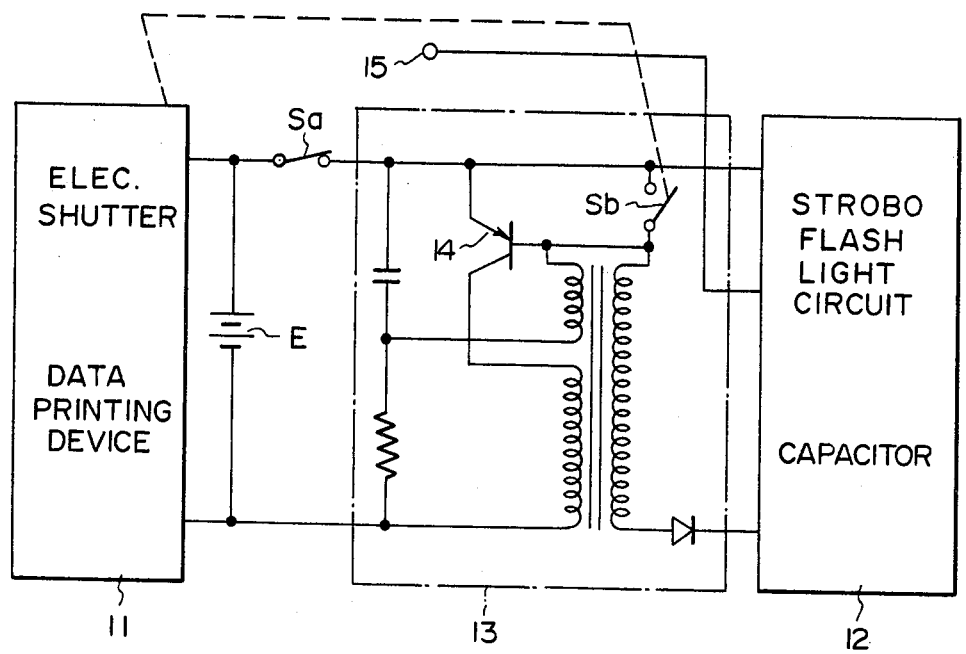
FIG. 2 is a circuit view showing an embodiment of the circuit employed in the control device in accordance with the present invention.

The normally open switch Sb is opened as shown in FIG. 2 when the operation of the data printing device 11 is finished, and the capacitor for discharging the strobo tube is charged. When the charging is completed, a neon tube (not shown) is turned on to indicate the ready condition of the strobo device. Then, when the shutter is released, a synchronizing signal is transmitted to a trigger terminal 15 and the strobo device is energized.

When the strobo tube is energized and the shutter is released to expose the film in the camera, the data printing device is operated to record the date on the film. The normally open switch, i.e. the charging stop switch, Sb is closed in response to operation of the data printing device to prevent the charging of the capacitor in the strobo device 12. Thus, the operation of the data printing device is conducted without undesirable affect of the voltage drop of the power source. When the operation of the data printing device is completed, the normally open switch Sb is opened again to start the charging of the capacitor.

The normally opened switch Sb is connected with the data printing device by way of an operation signal transmitting means which transmits a signal that indicates the start of the data printing operation to the normally open switch Sb. The signal transmitting means may be composed of a pair of contacts one of which is fixed to a movable member used to print data and the other of which is fixed to a stopper to stop the movable member. For instance, a light intercepting plate mounted on a pointer of an ammeter is used as a data printing means. In such a device, one of said contacts is fixed to an end of the light intercepting plate and the other is fixed to a stopper to stop the light intercepting plate which swings together with the pointer of the ammeter. Alternatively, a signal transmitting means may be provided between a shutter release button and the normally open switch. In this case, for instance, the switch is closed when the shutter release button is half depressed.

Figure 3:
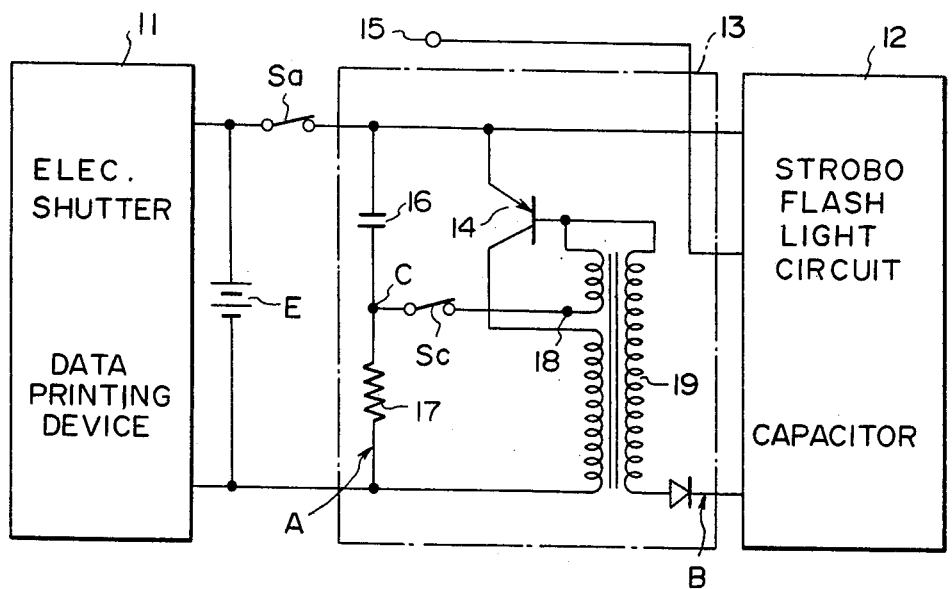
FIG. 3 is a circuit view showing another embodiment of the circuit employed in the control device in accordance with the present invention.

In the above described embodiment shown in FIG. 2, a normally open switch Sb is used for stopping the charging of the capacitor in the strobo device 12. However, it should be noted that the charging stop switch may be of normally closed type. One example of such a type of circuit is shown in FIG. 3. In FIG. 3, the elements equivalent to those shown in FIG. 1 are designated with the same reference numerals and characters.

A normally closed switch Sc is connected between a connecting point C between a capacitor 16 and a resistor 17 in the oscillating circuit 13 and an input terminal 18 of a booster 19. When the normally closed switch Sc is opened, the charging of the capacitor in the strobo device 12 is stopped and the power is totally used for energizing the data printing device 11. The position of the normally closed switch Sc is not limited to that shown in FIG. 3, but may be those as shown by A and B in FIG. 3.

Figure 4:
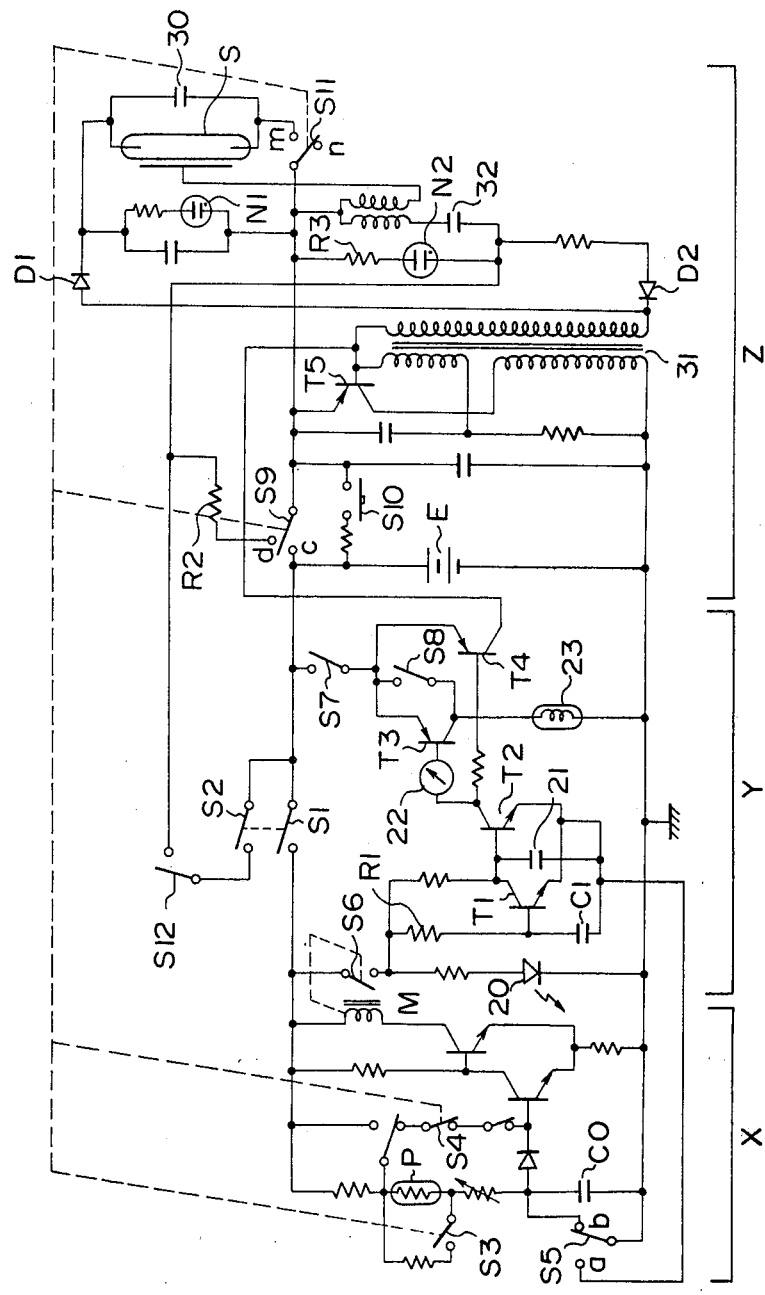
FIG. 4 is a circuit view showing still another embodiment of the circuit employed in the control device in accordance with the present invention.

Though the charging stop switch Sb or Sc shown in FIG. 2 or 3 is a mechanical relay switch, it is possible to replace the switch with a non-contact switch such as a semi-conductor switch. An example of a circuit employing a non-contact semi-conductor switch will be described with reference to FIG. 4. In FIG. 4, section X shows an electric shutter circuit, section Y shows a data printing circuit, and section Z shows a strobo circuit. The electric shutter circuit X includes a photodetector P and an integrating capacitor $C_0$ used for determining the exposure time. A switch $S_3$ which is closed when a flash light photograph is to be taken is connected in parallel with the photodetector P to obtain a predetermined exposure time for flash light photographing. A switch $S_4$ which is opened when a flash light photograph is to be taken is provided to release a slow lock device which operates to lock a shutter release mechanism when the controlled shutter speed is too slow to take a sharp picture with the camera body held by a hand. A switch $S_5$ which is changed over from contact b to a when the shutter is released is provided to start integration for exposure control and turn on a data printing circuit. The switch $S_5$ starts integration and turns on the data printing circuit when it is changed over from contact b to a, and is changed over from a to b when the film is wound up. A magnet M which controls the shutter mechanism and operates a switch $S_6$ is connected with the output of said photodetector P. The switch $S_6$ is closed when the magnet M is deenergized and a shutter release button is depressed to close the power switch $S_1$. Therefore, in the normal shutter operation in which the shutter release button is depressed and the magnet M is energized and then after a controlled exposure time has lapsed the magnet M is deenergized, the switch $S_6$ is closed. And then when the shutter release button is released, the switch $S_6$ is opened again.

The data printing circuit Y includes the switch $S_6$ and the power switch $S_1$ which is closed upon depression of the shutter release button. A light emitting diode 20 is connected in series with the switch $S_6$ to indicate underexposure when the output level of the photodetector P is too low to energize the magnet M and the switch $S_6$ is closed after the switch $S_4$ is closed in the normal photographing condition. In this case, since the switch $S_5$ is in the contact b side, the data printing circuit Y does not work. The data printing circuit Y further includes a Schmidt circuit 21 comprising a pair of transistors $T_1$ and $T_2$. A capacitor $C_1$ and a resistor $R_1$ constitute a time constant circuit which controls the operation of the transistor $T_1$. When a predetermined time has lapsed since the switch $S_6$ was closed, the time constant circuit $C_1, R_1$ turns on the transistor $T_1$. An ammeter 22 is connected with the output of the Schmidt circuit 21 and is swung when the transistor $T_2$ is turned on. The ammeter 22 is provided with a light intercepting plate mounted thereon. The light intercepting plate mounted on the ammeter 22 opens an optical path of a data printing optical system. A data printing main switch $S_7$ is connected the ammeter 22 by way of a transistor $T_3$ and is closed when the data is to be printed. A normally open switch $S_8$ is connected between the collector and emitter of the transistor $T_3$ and between the main switch $S_7$ and a data printing lamp 23 to turn on the lamp 23 when the data is desired to be viewed through a view finder. The transistor $T_3$ and another transistor $T_4$ connected therewith are turned on and off when the data is to be printed. The collector of the transistor $T_4$ is connected with the base of an oscillating transistor in the strobo circuit Z.

The strobo circuit Z includes a charging circuit for charging a main capacitor 30 for energizing a strobo flash light tube S. A blocking oscillator 31 is connected with a power source E by way of a manual switch $S_9$, and with the strobo tube S by way of a relay switch $S_{11}$. The relay switches $S_9$ and $S_{11}$ are changed over from d to c and n to m when the flash light is to be used. The blocking oscillator 31 has two output terminals connected with diodes $D_1$ and $D_2$, respectively. The output of the oscillator 31 contributes to charge the main capacitor 30 by way of the diode $D_1$, and to charge a trigger capacitor 32 and intermittently turn on a neon tube $N_2$ in a charging indicator by way of the diode $D_2$. When the main capacitor 30 is charged up, another neon tube $N_1$ in a charge-up indicator is intermittently turned on. A battery check switch $S_{10}$ is connected between the power source E and the neon tube $N_1$ so that the neon tube $N_1$ is turned on upon closure thereof when the power source level is over a predetermined value. In this case, the switches $S_9$ and $S_{11}$ are in the contact d and m side. A discharge resistance $R_2$ is connected with the trigger capacitor 32 to prevent an inadvertent trigger when the switch $S_9$ is in the contact d side in the nonflash light photographing condition. Further, as shown in the drawing, the trigger capacitor 32 also contributes to intermittent energization of the neon tube $N_2$. In order that there will not be generated a trigger signal, a resistor $R_3$ is connected in series with the neon tube $N_2$. The neon tube $N_2$ is turned on when the main capacitor 30 is being charged. A trigger switch $S_{12}$ is connected with the trigger capacitor to transmit a synchronizing signal from a shutter mechanism to the trigger capacitor 32 to energize the strobo tube S.

In operation of the above described circuit as shown in FIG. 4, related switches $S_3$, $S_4$ and $S_{11}$ are changed over into ON, OFF and contact m state to operate the blocking oscillator 31 when the power switch $S_9$ is put into the contact c side by a manual operation of the photographer to prepare for the flash light photographying. The output of oscillator 31 by way of the diode $D_1$ charges the main capacitor 30 and the output by way of the diode $D_2$ charges the trigger capacitor 32. The charging of the trigger capacitor 32 is completed in short time and the neon tube $N_2$ is turned on. By the turning on of the neon tube $N_2$, the terminal voltage of the trigger capacitor 32 drops and the neon tube $N_2$ is turned off. Simultaneously, the charging of the trigger capacitor 32 is conducted and the neon tube $N_2$ is intermittently turned on as a result. Therefore, the intermittent energization of the neon tube $N_2$ indicates that the oscillator 31 is being operated that is the charging power switch for the flash light tube is closed to charge the tube.

When the main capacitor 30 is charged up, the neon tube $N_1$ is turned on to indicate that the strobo can be used. Then, upon depression of a shutter release button to close the power switch $S_1$, the trigger switch $S_{12}$ is turned on and the main capacitor 30 is discharged to conduct a flash light photographing. In response to the operation of the shutter at this stage, the switch $S_5$ is put into the contact a side. Further, the data printing power switch $S_7$ is in the ON state.

Then, when the exposure is completed and the magnet M is deenergized, the switch $S_6$ is turned on. The transistor $T_2$ is turned on before the transistor $T_1$ is turned on, and the transistors $T_3$ and $T_4$ are turned on to swing the light intercepting plate mounted on an ammeter 22. Further, the data printing lamp 23 is turned on to print desired data on the film. Simultaneously, the collector current of the transistor $T_4$ turns off the oscillating transistor $T_5$ and stops the charging of the main capacitor 30.

Then, the transistor $T_1$ is turned on and the transistor $T_2$ is turned off to complete the data printing operation. Thus, the oscillating transistor $T_5$ is put into the operating state and the charging of the main capacitor is started again. When the depression of the release button is released, the switch $S_6$ is turned off and the switch $S_5$ is changed over to the contact b side by a film wind up operation. Thus, the circuit is returned to the initial state.

In the above described embodiment of the invention in which the data printing circuit Y and the strobo circuit Z are connected electrically, the operations of the circuits are sequentially connected.

I claim:

1. In a photographic camera provided with an electronic flash light device including a capacitor used for discharging an electronic flash light tube, and an oscillator for charging the capacitor and an additional electrically operated data printing device wherein a single power source is commonly used for energizing the electronic flash light device and the data printing device; the combination including a device for controlling the flash light tube comprising means for turning off the oscillator to stop the charging of the capacitor at least for the period from the discharging of the flash light tube to the completion of the operation of said data printing device.

2. In a photographic camera provided with an electronic flash light device including a capacitor used for discharging an electronic flash light tube and an oscillator for charging the capacitor, and an additional electrically operated data printing device wherein a single power source is commonly used for energizing the electronic flash light device and the data printing device; the combination including a device for controlling the flash light tube comprising a first electronic switch provided in said oscillator of the electronic flash light device for turning off the oscillator to prevent the charging of said capacitor said first electronic switch selectively having two states in one of which said first electronic switch is operating to turn on said oscillator and in the other of which said first electronic switch turns off said oscillator, and a second electronic switch connected with said first electronic switch for keeping the first electronic switch put in the other state to turn off the oscillator at least for the period from the discharging of the flash light tube to the completion of the operation of said data printing device, whereby the charging of the capacitor by the single power source through the oscillator is stopped at least for the period from the discharging of the flash light tube to the completion of the operation on the data printing device.

3. In a photographic camera provided with an electronic flash light device including a capacitor used for discharing an electronic flash light tube and an oscillator for charging the capacitor, and an additional electrically operated data printing device wherein a single power source is commonly used for energizing the electronic flash light device and the data printing device; the combination including a device for controlling the flash light tube comprising an electronic switch provided in said oscillator of the electronic flash light device for keeping the oscillator turned off to prevent the charging of said capacitor while said data printing device is being operated, said electronic switch selectively having two states in one of which said electronic switch is operating to turn on said oscillator and in the other of which said electronic switch turns off said oscillator, said electronic switch being connected with said data printing device for detecting operation of the data printing device and generating a signal which indicates that the data printing device is being operated, said electronic switch being put into said one state normally and put into said the other state upon receipt of the signal from said means, whereby the charging of the capacitor by the single power source through the oscillator is initiated in response to completion of the operation of said data printing device, and stopped in response to start of the operation thereof.

4. A camera with at least photoflash means and data photographic means operated with a single battery, said photoflash means having means for performing its preparatory operation of charging a main capacitor with high voltage produced in a step-up circuit by electrical oscillation with the battery used as a power source and its flash operation in synchronization with exposure operation for flash photography, said data photographic means being so arranged as to electrically control its operation of recording data on film with the same battery used as a power source, said camera comprising means for interrupting the preparatory operation of the photoflash means with an operating signal for the data photographic means during its recording operation, in case a picture is taken by operating the photoflash means and the data photographic means.

5. A camera as claimed in claim 4, wherein means is provided for stopping the oscillating operation of the photoflash means with the operating signal for the data photographic means during its recording operation, in case a picture is taken by operating the photoflash means and the data photographic means.

* * * * *